United States Patent [19]

Takahashi

[11] Patent Number: 5,148,071
[45] Date of Patent: Sep. 15, 1992

[54] SWING-TYPE ACTUATOR WITH THIN REINFORCED MOVABLE COIL

[75] Inventor: Fumihiko Takahashi, Menuma, Japan
[73] Assignee: Hitachi Metals, Ltd., Tokyo, Japan
[21] Appl. No.: 672,436
[22] Filed: Mar. 20, 1991

[30] Foreign Application Priority Data

Mar. 22, 1990 [JP] Japan ................. 2-29329[U]

[51] Int. Cl.⁵ ............... H02K 23/26; H02K 33/16; G11B 5/55
[52] U.S. Cl. ...................... 310/208; 29/605; 310/15; 336/65; 360/106
[58] Field of Search ............ 29/605; 310/15, 116, 310/208; 335/222; 336/65, 67, 208; 360/106

[56] References Cited

U.S. PATENT DOCUMENTS

| | | | |
|---|---|---|---|
| 4,150,407 | 4/1979 | Dijkstra | 360/106 |
| 4,196,456 | 4/1980 | Manzke | 360/106 |
| 4,544,973 | 10/1985 | Van De Bult | 360/106 |
| 4,553,058 | 11/1985 | Iwasaki. | |
| 4,639,624 | 1/1987 | Ejiri et al.. | |
| 4,849,840 | 7/1989 | Fujiyoka | 360/106 |
| 4,855,853 | 8/1989 | Matsushita et al.. | |
| 4,879,617 | 11/1989 | Sampietro et al. | 360/106 |
| 4,949,194 | 8/1990 | MacPherson et al. | 360/106 |
| 4,951,023 | 8/1990 | Erd et al. | 335/222 |
| 4,985,652 | 1/1991 | Oudet et al. | 360/106 |
| 5,034,837 | 7/1991 | Schmitz | 360/106 |

FOREIGN PATENT DOCUMENTS

| | | |
|---|---|---|
| 55-67975 | 5/1980 | Japan. |
| 56-19561 | 2/1981 | Japan. |
| 58-57721 | 4/1983 | Japan ............ 29/605 |
| 59-124066 | 7/1984 | Japan. |
| 60-159566 | 10/1985 | Japan. |
| 63-142574 | 6/1988 | Japan. |
| 64-89946 | 4/1989 | Japan. |
| 2-310865 | 12/1990 | Japan. |

Primary Examiner—Steven L. Stephan
Assistant Examiner—D. L. Rebsch
Attorney, Agent, or Firm—Finnegan, Henderson, Farabow, Garrett & Dunner

[57] ABSTRACT

The swing-type actuator includes (a) a housing comprising a pair of yokes opposing each other and a permanent magnet attached to at least one of the yokes for defining a magnetic gap therebetween, (b) a swingable arm having one end to which a hold member encompassing a periphery of a movable coil is fixed, and the other end to which a function member is fixed, such that the movable coil is swingable in the magnetic gap, and (c) a thin non-magnetic plate adhered to at least part of a surface of the movable coil facing the permanent magnet. The hold member is made of a thermoplastic resin and molded integrally with the movable coil and the arm, and the hold member has substantially the same thickness as that of the movable coil.

8 Claims, 5 Drawing Sheets

SWING-TYPE ACTUATOR WITH THIN REINFORCED MOVABLE COIL

BACKGROUND OF THE INVENTION

The present invention relates to a swing-type actuator such as an actuator for magnetic disk drives, and more particularly to a swing-type actuator with a thin, reinforced movable coil and capable of swinging a function member such as a magnetic head along a circular course.

Conventionally, the positioning of a magnetic head on a recording track of a magnetic disk, etc. is conducted by a swing-type or rotation-type actuator as shown in FIGS. 7, 8. In both figures, a yoke 1 is fixedly provided with permanent magnets 2, and a pair of yokes 1 are assembled by supports 3 such that different magnetic poles of the permanent magnets 2 are opposite each other via a magnetic gap 4 to form a magnetic circuit. 5 represents an arm having one end to which a flat movable coil 6 is fixed, and the other end to which a magnetic head (not shown) is fixed. The arm 5 is arranged such that the movable coil 6 located in the magnetic gap 4 can swing around a shaft 7. When an operation signal is supplied to the movable coil 6, a magnetic force generated from the movable coil 6 according to Fleming's left hand rule functions as an attraction force or a repulsion force to each permanent magnet 2, so that the arm 5 is rotated around the shaft 7. As a result, a magnetic head (not shown) fixed to a tip end of the arm 5 is positioned on a desired magnetic track of a magnetic disk (not shown). The direction of the rotation of the arm 5 can be changed by inverting the direction of current applied to the movable coil 6.

In the above conventional actuator for magnetic disk drives, the movable coil 6 is usually fixed to the arm 5 by an adhesive. However, the fixing of the movable coil 6 by an adhesive is sometimes troublesome, failing to provide accurate positioning of the movable coil 6. In addition, handling of terminals of the movable coil 6 is complicated, lowering the efficiency of assembling the arm 5. Since there is increasingly higher demand for miniaturization and reduction in thickness of magnetic disk drives, it is necessary to improve the positioning accuracy of the movable coil 6, and the productivity and reliability of fixing the movable coil 6 to the arm 5. In this sense, the conventional arms fail to satisfy these requirements.

Attempts have been made to integrally fix a movable coil to an arm by a resin molding (for instance, Japanese Utility Model Laid-Open No. 60-159566 and U.S. Pat. No. 4,855,853). In such a structure, the movable coil can be easily fixed, and the thickness of the movable coil can be significantly reduced. Accordingly, such a structure is advantageous for miniaturizing actuators. Also, a magnetic circuit member is constituted by fixing a permanent magnet to only one of the yokes, thereby making the actuator thinner.

However, the conventional resin molding fails to show sufficient mechanical strength and sufficient adhesion to the arm and a movable coil. Further, since the movable coil is molded together with a hold member, a resin layer having a relatively large thickness is formed on each side of the movable coil. As a result, the actuator is relatively thick, requiring the large magnetic gap. Therefore, the magnetic properties of the permanent magnet cannot be fully utilized, leading to the poor performance of the actuator.

OBJECT AND SUMMARY OF THE INVENTION

An object of the present invention is to provide a small and thin swing-type actuator in which a movable coil is strongly fixed to an arm, whereby the above-mentioned problems inherent in the conventional technology can be eliminated.

The swing-type actuator according to the present invention comprises:

(a) a housing comprising a pair of yokes and a permanent magnet attached to at least one of the yokes opposing each other for defining a magnetic gap therebetween;

(b) a swingable arm having one end to which a hold member encompassing a periphery of a movable coil is fixed and the other end to which a function member is fixed, such that the movable coil is swingable in the magnetic gap, the hold member being made of a thermoplastic resin and molded integrally with the movable coil and the arm, the hold member having substantially the same thickness as that of the movable coil; and (c) a thin non-magnetic plate adhered to at least part of a surface of the movable coil facing the permanent magnet.

BRIEF DESCRIPTION OF THE DRAWINGS

FIG. 4 (b) is a graph showing the relation between the sensitivity of the movable coil and frequency in the swing-type actuator shown in FIG. 5;

DETAILED DESCRIPTION OF THE PREFERRED EMBODIMENTS

Before delving into the details of the swing-type actuator according to the present invention, explanation will be made on the swing-type actuator previous proposed by the applicant (U.S. Ser. No. 539,223 filed Jun. 18, 1990), as an actuator having a coil means integrally molded by a resin. This swing-type actuator comprises (a) a housing comprising two yokes and permanent magnets attached to the yokes with their different magnetic poles opposing each other, a magnetic gap existing between the opposing permanent magnets; and (b) a swingable arm having one end to which a movable coil is fixed and the other end to which a function member is fixed, such that the movable coil is swingable in the magnetic gap, a periphery of the movable coil being integrally fixed to the arm by a hold member made of a thermoplastic resin having a particular modulus, the hold member having substantially the same thickness as that of the movable coil.

Figure 5:
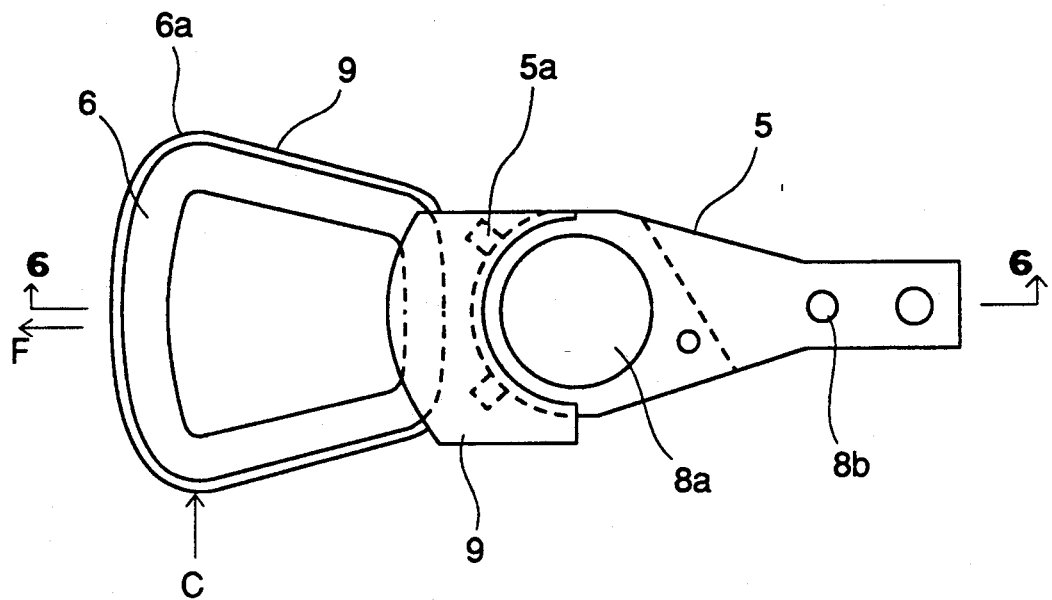
FIG. 5 is a plan view showing the swing-type actuator of U.S. Ser. No. 539,223.
Figure 6:
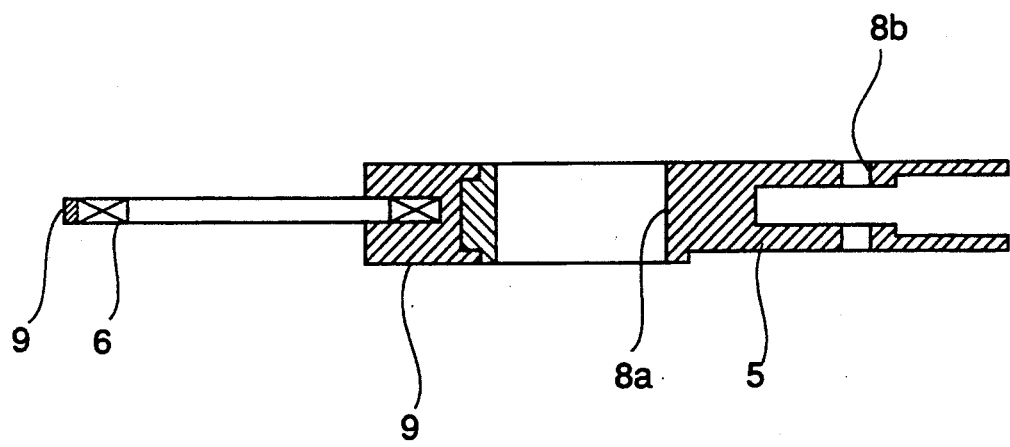
FIG. 6 is a cross-sectional view taken along the line 6—6, in FIG. 5.
Figure 7:
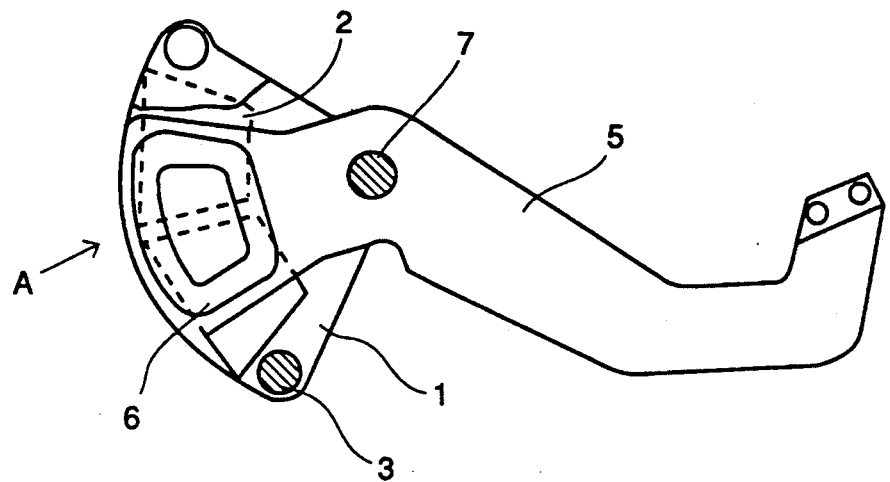
FIG. 7 is a partially broken plan view showing a conventional swing-type actuator.
Figure 8:
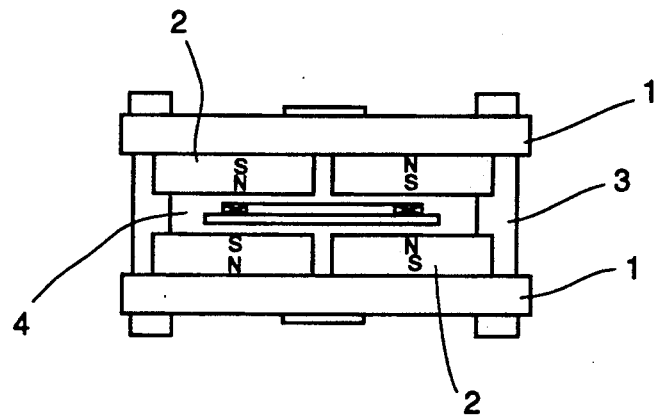
FIG. 8 is a side view of the swing-type actuator of FIG. 7 when viewed from A.

Referring to FIGS. 5 and 6 in which the same reference numerals are assigned to the same parts as in FIGS. 7 and 8, the previously proposed swing-type actuator will be explained. An arm 5, which may be produced from a die-cast aluminum alloy, has an aperture 8a in a center portion. A shaft (not shown) is rotatably fitted in the aperture 8a, so that the arm 5 is rotatably supported by a housing (not shown). The arm 5 is also provided with an aperture 8b at one end for mounting a function member (not shown) such as a magnetic head to the arm 5, and fingers 5a at the other end for fixedly supporting a hold member 9. The hold member 9 is made of a thermoplastic resin and encompasses the fingers 5a of the arm 5 and the movable coil 6. Thus, the hold member 9 can integrally fix the movable coil 6 to the arm 5. Incidentally, the movable coil 6 can be produced by winding a self-melting wire which has a self-melting coating around a core wire at a predetermined number of windings to form a multi-layer coil and then flowing current through this coil to generate heat for integrally fusing the wire.

The integral fixing of the movable coil 6 to the arm 5 is preferably conducted by injection molding. In the injection molding, the die-cast arm 5 and the movable coil 6 are placed in an injection mold, and a molten thermoplastic resin such as a polyphenylene sulfide containing glass fibers is injected into the mold. After solidification, the resulting molding is taken out of the mold. In this case, since the fingers 5a of the arm 5 are embedded in the hold member 9, the hold member 9 is prevented from being detached from the arm 5.

In the swing-type actuator having the above structure, since the bonding operation of the movable coil 6 to the arm 5 can be omitted, unlike the conventional swing-type actuator, the assembling of the swing-type actuator is extremely easy. In addition, the positioning accuracy and fixing reliability of the movable coil 6 and the arm 5 are dramatically improved. Nevertheless, further improvements are desired with respect to the following points.

The periphery of the ring-shaped movable coil 6 is fixed to the hold member 9, and the hold member 9 has a thickness substantially equal to that of the movable coil 6 to avoid interference with other parts of the swing-type actuator. As a result, the movable coil 6 may not necessarily have sufficient rigidity (i.e. stiffness) in a direction in a plane parallel to the surface of the permanent magnet. Accordingly, the movable coil 6 is likely to be deformed and have a decreased resonance frequency, which causes a resonance phenomenon in for high actuation frequency operation.

Figure 1:
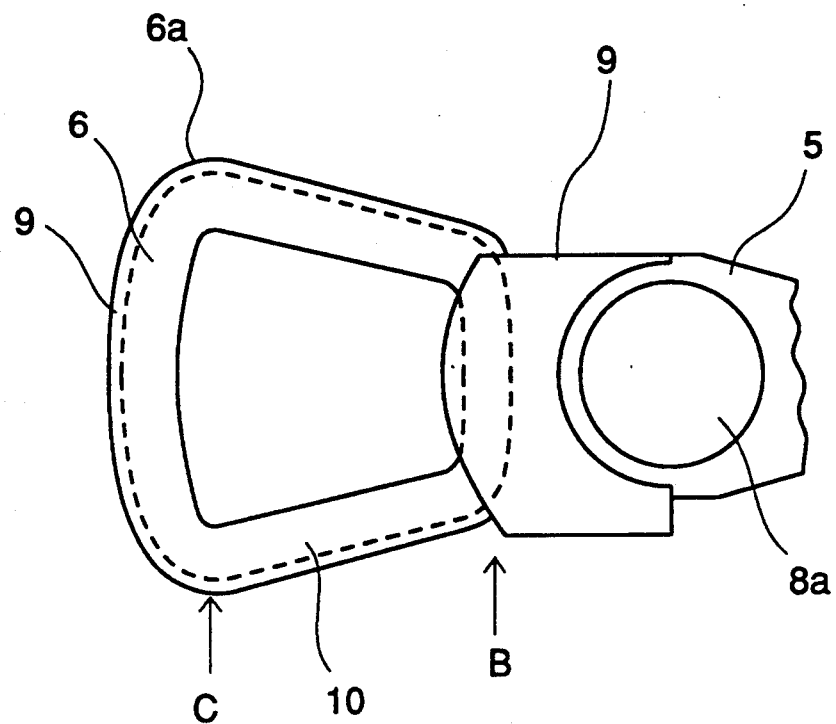
FIG. 1 is a plan view showing the swing-type actuator according to one embodiment of the present invention.
Figure 2:
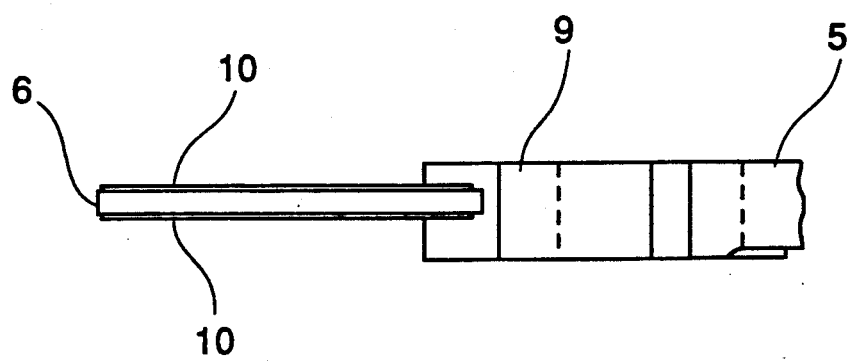
FIG. 2 is a side view when viewed from B in FIG. 1.

The present invention provides a swing-type actuator free from the above problems. FIGS. 1 and 2 show the swing-type actuator according to one embodiment of the present invention. In FIGS. 1 and 2, the same reference numerals are assigned to the same parts as in FIGS. 5 and 6. Referring to FIGS. 1 and 2, a thin plate 10 is fixed by an adhesive, etc. to a surface of the movable coil 6 encircled by a U-shaped hold member 9. The thin plate 10 may be a stainless steel plate having a thickness of 50 μm. By this structure, the rigidity of the movable coil 6 in a direction along a plane parallel to the surface of the permanent magnet (parallel to a paper plane in FIG. 1 and perpendicular to a paper plane in FIG. 2) is greatly increased.

Figure 3:
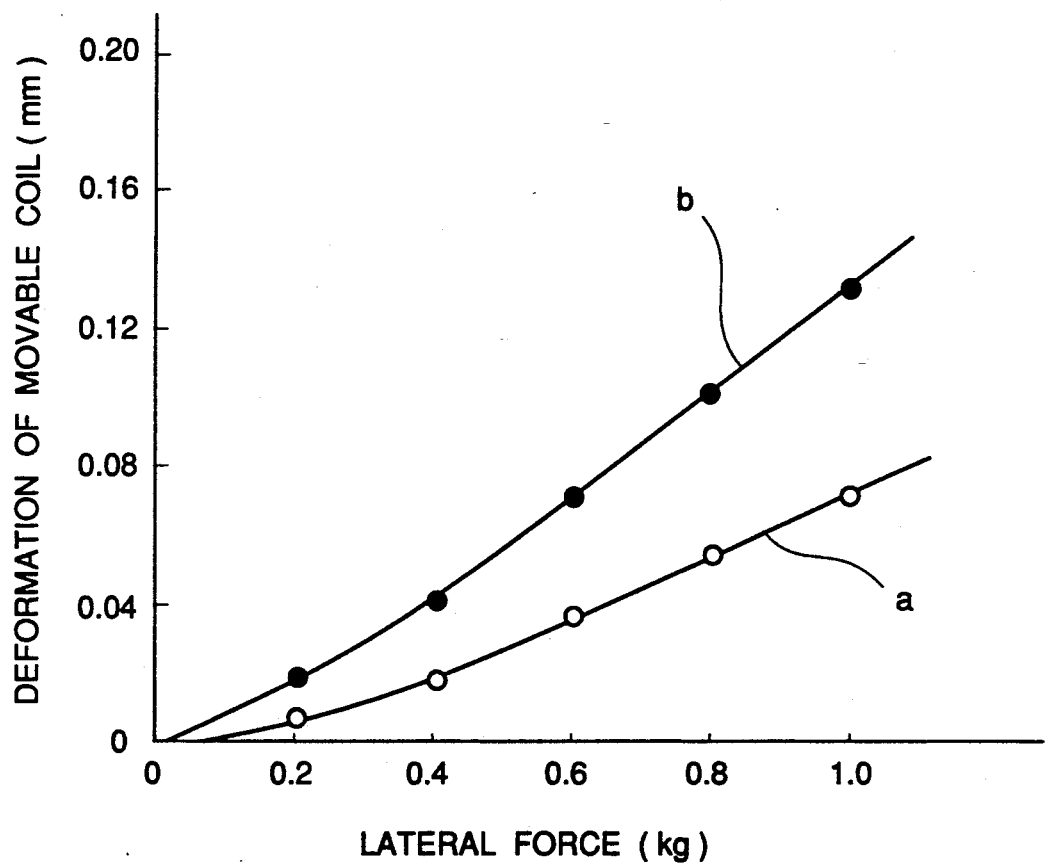
FIG. 3 is a graph showing the relation between lateral force and the deformation of the movable coil.

FIG. 3 shows the relation between a lateral force applied to the movable coil 6 and the deformation of the movable coil 6. In the measurement of deformation, the arm 5 and the hold member 9 were kept stationary, and a lateral force was applied to the movable coil 6 in the direction C, and the deformation was measured at a position 6a. The same measurement was conducted with respect to the swing-type actuator shown in FIG. 5.

As is clear from FIG. 3, in the swing-type actuator shown in FIG. 5, the deformation of the movable coil drastically increases as the lateral force increases (shown by the curve "b"), and the deformation is 0.13 mm at a lateral force of 1.0 kg. On the other hand, in the swing-type actuator shown in FIG. 1 which has a thin plate 10 adhered to a surface of the movable coil 6, the rigidity of the movable coil 6 is greatly increased, so that the deformation of the movable coil 6 is kept small as the lateral force increases (shown by the curve "a"). The deformation is as small as 0.07 mm at a lateral force of 1.0 kg. This deformation level is almost one-half of that shown by the curve "b."

Figure 4A:
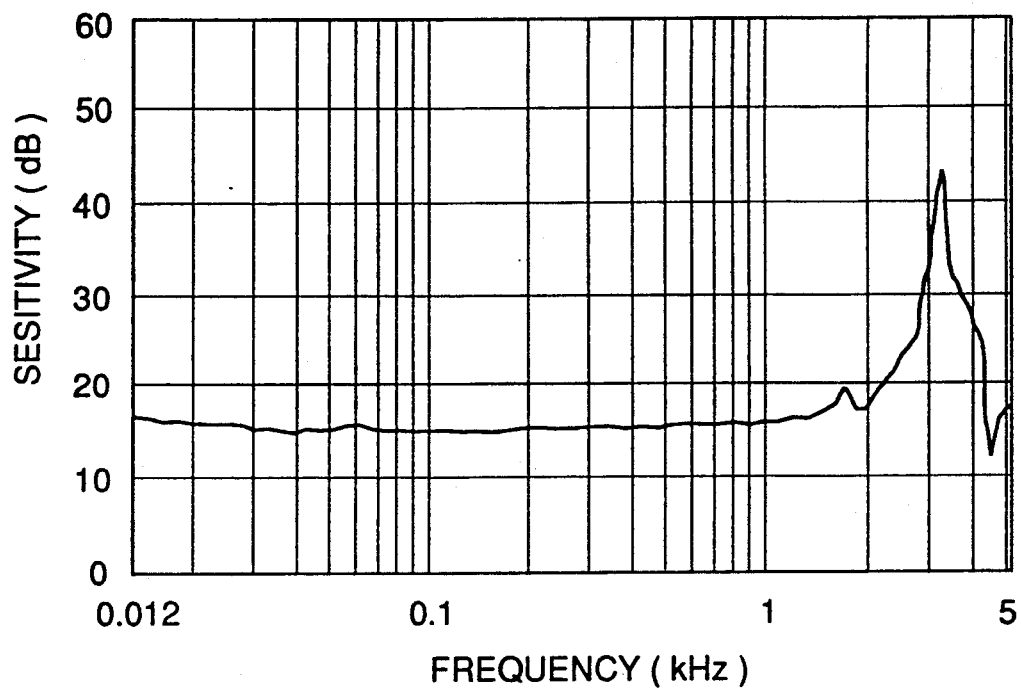
FIG. 4 (a) is a graph showing the relation between the sensitivity of the movable coil and frequency in the swing-type actuator of the present invention.
Figure 4B:
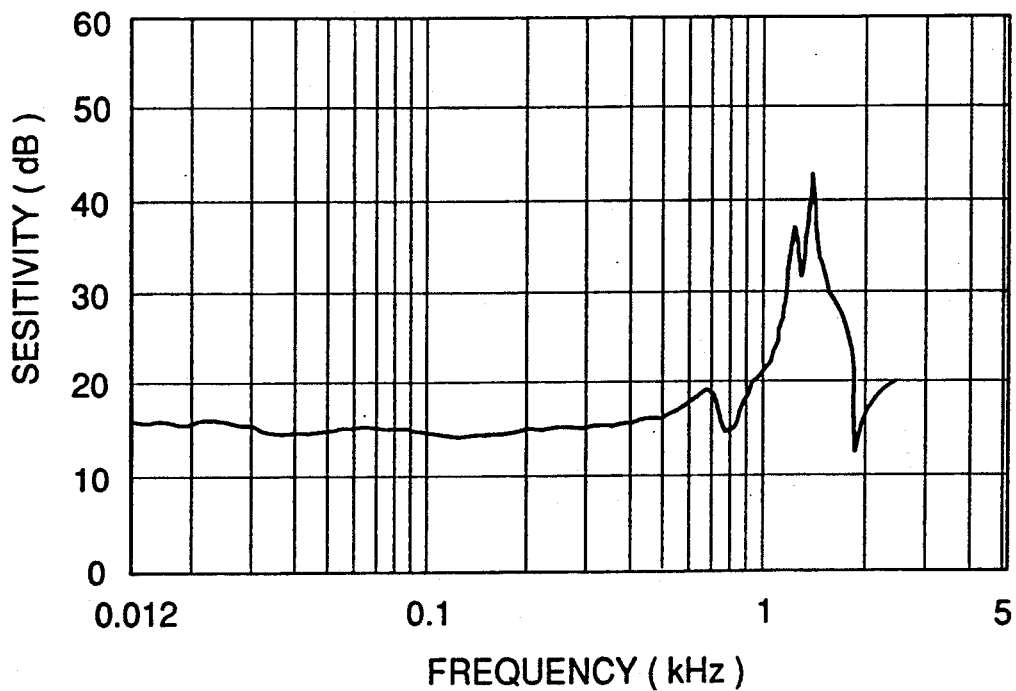

FIGS. 4 (a) and (b) show the relation between the sensitivity of the movable coil and frequency in the swing-type actuator of the present invention and the swing-type actuator shown in FIG. 5, respectively. The movable coil 6 shown in FIGS. 1, 5 was placed on a vibration means, and an acceleration sensor was placed on the movable coil 6 to measure its sensitivity. In this case, the movable coil 6 was formed by a 1-mm-diameter copper wire (300 turns), and the measurement was conducted at an input current of 0.2 A. The sensitivity was determined according to the following equation:

$$g = 20 \, log_{10} (f/V)$$

wherein
g: Sensitivity (dB)
f: Frequency
V: Voltage

In the swing-type actuator shown in FIG. 5, as shown in FIG. 4 (b), the sensitivity drastically increases when the frequency exceeds 1 kHz, and it is maximum at 1.5 kHz, causing resonance. On the other hand, in the swing-type actuator of the present invention, as shown in FIG. 4 (a), the sensitivity remains unchanged even when the frequency reaches 2 kHz, and the resonance frequency is about 3 kHz. This means that when used as a high-speed actuator, the swing-type actuator of the present invention is extremely stable.

In the above Example, the thin plate was made of stainless steel, but it should be noted that any other non-magnetic materials may be used. Those having large mass such as non-magnetic metals having specific gravities of 7 or more are desirable. This thin plate need not be adhered to both surfaces of the movable coil, and it may optionally be adhered to one surface or a part of the movable coil. The thickness of the thin plate is not particularly restricted. However, if it is too thin, the rigidity of the movable coil is not sufficiently increased. In this sense, the thin plate desirably has a thickness of 20 μm or more. With respect to the upper limit of the thickness, it is determined by a gap between the movable coil and the permanent magnet. However, if the thin plate is too thick, the movable portion of the swing-type actuator has too large an inertia. Accordingly, the thickness of the thin plate is desirably one-third or less, more preferably one-fifth or less of the gap between the movable coil and the permanent magnet.

With respect to a magnetic circuit portion, the permanent magnet may be fixed to one or both of the opposing yokes. When the permanent magnet is fixed to one of the yokes, the magnetic gap is defined by the permanent magnet and the other yoke. Also, when each permanent magnet is fixed to each yoke, the magnetic gap is formed between the opposing permanent magnets.

As described above in detail, the structure of the swing-type actuator according to the present invention ensures high rigidity of the movable coil, even though a periphery of the movable coil is supported by the hold member having substantially the same thickness as that of the movable coil. Accordingly, the swing-type actuator has an extremely high resonance frequency, causing no resonance phenomenon, even at a high frequency region. This enables the swing-type actuator of the present invention to be operated stably in a wide range of frequency including as high a frequency as 2 kHz or so.

What is claimed is:

1. A swing-type actuator comprising:
   (a) a housing comprising a pair of yokes opposing each other and a permanent magnet attached to at least one of said yokes for defining a magnetic gap therebetween;
   (b) a coil having a thickness to be movable through said gap and including a periphery;
   (c) a hold member encompassing the periphery of said coil;
   (d) a swingable arm having one end to which said hold member encompassing the periphery of the movable coil is fixed and another end to which a function member is fixable, said movable coil being swingable in said magnetic gap by said arm, said hold member being made of a thermoplastic resin and molded integrally with said movable oil and said arm, said hold member having substantially the same thickness as that of said movable coil; and
   (e) means for stiffening said coil against deformation in the direction of swinging movement, said stiffening means including a thin non-magnetic plate adhered to at least part of a surface of said movable coil facing said permanent magnet.

2. The swing-type actuator according to claim 1, wherein said thin non-magnetic plate is a non-magnetic metal plate having a thickness which is one-third or less of the distance between the surface of said movable coil and said permanent magnet.

3. The swing-type actuator according to claim 1, wherein said thin non-magnetic plate is a non-magnetic metal plate having a thickness greater than about 20 $\mu m$.

4. The swing-type actuator according to claim 1, wherein said thin non-magnetic plate is a stainless steel plate having a thickness of about 50 $\mu m$.

5. The swing-type actuator according to claim 1, wherein said non-magnetic plate is a non-magnetic metal plate which is on-fifth or less of the distance between the surface of said movable coil and said permanent magnet.

6. The swing-type actuator according to claim 1, wherein said encompassed coil includes a central aperture oriented in the thickness direction.

7. The swing-type actuator according to claim 6, wherein said coil has an inner periphery, and wherein the outer extend of said central aperture in the plane of said coil is substantially coincident with said inner periphery.

8. The swing-type actuator according to claim 1, wherein said thin plate extends substantially across the coil in the swinging direction.

* * * * *

UNITED STATES PATENT AND TRADEMARK OFFICE
CERTIFICATE OF CORRECTION

PATENT NO.   : 5,148,071
DATED        : September 15, 1992
INVENTOR(S)  : Fumihiko Takahashi It is certified that error appears in the above-identified patent and that said Letters Patent is hereby corrected as shown below:

```
Claim 1, column 6, line 1, "oil" should read --coil--.
Claim 5, column 6, line 23, "on-fifth" should read
                                    --one-fifth--.
Claim 7, column 6, line 31, "extend" should read --extent--.
```

Signed and Sealed this

Twenty-first Day of September, 1993

Attest:

BRUCE LEHMAN

Attesting Officer          Commissioner of Patents and Trademarks